July 31, 1962   F. A. BOZZACCO   3,047,442
INORGANIC LAMINATE
Filed July 29, 1957

INVENTOR.
FRANCIS A. BOZZACCO
BY
*R. L. Miller*
ATTORNEY

United States Patent Office 3,047,442
Patented July 31, 1962

3,047,442
INORGANIC LAMINATE
Francis A. Bozzacco, Massillon, Ohio, assignor to Goodyear Aircraft Corporation, Akron, Ohio, a corporation of Delaware
Filed July 29, 1957, Ser. No. 674,813
5 Claims. (Cl. 154—2.6)

This invention relates to the fabrication of inorganic laminates and a process for preparing such laminates.

Prior practices in the laminating field have been directed toward obtaining a combination of desirable characteristics, namely, maximum structural strength coupled with minimum density. In certain uses for laminated structures additional characteristics are essential, for example, fire resistance, good electrical properties, good insulating characteristics, and impact resistance.

Various attempts have been made to fabricate a structure embodying these desirable characteristics. Nevertheless, it has been customary to sacrifice strength to obtain low density or to sacrifice low density to obtain maximum strength. In certain desirable uses for laminated structures, the incorporation of these optimum conditions in a practical laminated structure has been heretofore impossible or impractical.

Additional problems have been developed with the great increase in speed characteristic of present-day planes and missiles. For example, ordinary thermoplastic and thermosetting resin laminates will not stand the high frictional temperatures which may reach as high as 2500° F. and higher.

It is an object of this invention to fabricate a laminate which resists thermal and structural distortion at temperatures to 2500° F. and higher. It is a further object of this invention to provide a laminate comprised of layers of resin coated inorganic fibers held together in spaced apart relationship by means of an inorganic binder. It is another object of this invention to provide a process for fabricating a laminate which is comprised of layers of resin-coated inorganic fibers held together in spaced apart relationship by means of an inorganic binder.

In the practice of this invention sheets of inorganic fibers, either loose or woven, e.g., as rovings, yarns, ropes, tapes, or cloths, are coated with one or more protective resins and are plied together and adhesively joined in spaced apart relationship by means of one or more inorganic binders.

Figure 1:
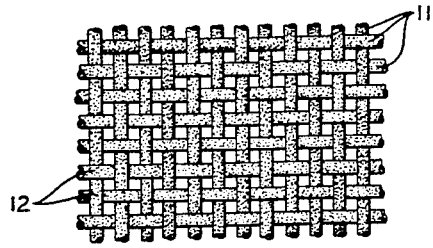
Figure 2:
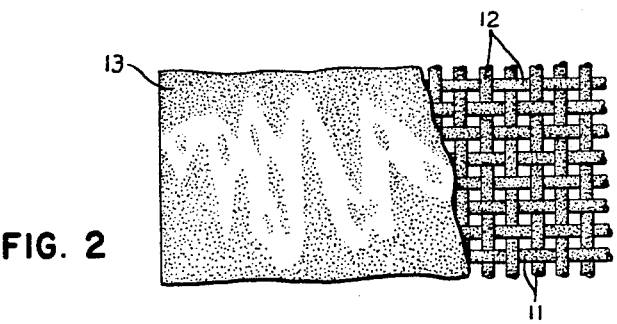
Figure 3:
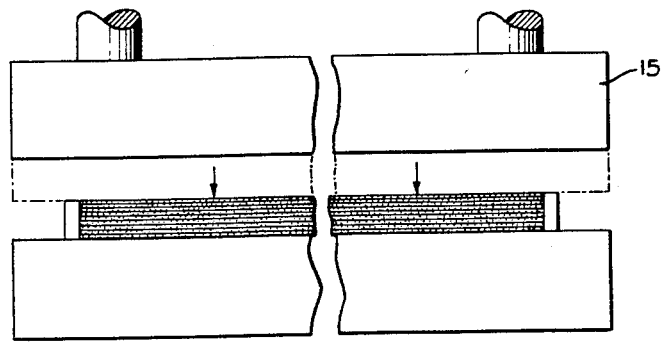
Figure 4:
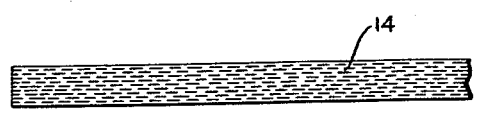

In the drawings, FIG. 1 is a plan view of a section of fabric showing the individual coated fibers; FIG. 2 is a similar view of the fabric of FIG. 1 showing an inorganic binder coating thereon; FIG. 3 is a cross-section of a mold showing a laminate undergoing compression; and FIG. 4 is a cross-section of the finished laminate after molding.

As shown in FIG. 1, inorganic fibers are spun to provide filaments 11 which are in turn woven together to form a fabric. The filaments are customarily about .025 inch in diameter. Because most inorganic binders are alkaline in nature and thus tend to degrade the inorganic fibers, it is necessary that the fibers of the fabric be coated with a protective resin 12.

The fabrics of this invention may be woven from filaments comprised of any inorganic fibers, e.g., glass fibers.

Any of the customary coating resins may be used such as the various silicone resins. These known silicone resins can be described as substituted compounds of silicon which normally contain silicon combined with carbon and/or oxygen in the form of a chain which is normally substituted on the silicon atoms. These compounds are customarily referred to as polysilanes and polysiloxanes and may be based on either a cross-linked or linear skeleton. The attached radicals may be alkyl or aryl radicals. Suitable silicone resins are described in "Silicones and Their Use" by Rob Roy McGregor, 1st ed., McGraw-Hill Book Co., Inc., and "Silicones" by T. P. Kauppi, Modern Plastics, Encyclopedia Issue, September 1956.

The coating resins are customarily dissolved in a solvent such as toluene, benzene, gasoline, etc., in order to expedite coating the fabrics, the solvent being removed by heat.

The treated fabric is thereafter coated with an inorganic binder 13 as shown in FIG. 2. The inorganic binder may be any of the customary inorganic compositions which harden under the influence of atmospheric ageing or elevated temperatures, e.g., sodium silicate, potassium silicate, magnesium oxysulfate, magnesium oxychloride, calcium aluminate, silica gel, and the various phosphate cements, e.g., aluminum-phosphate cements comprised of aluminum oxide and phosphorus pentoxide marketed by Monsanto Chemical Company as Alkophos C and Alkophos C.E. and the reaction products of phosphoric acid and aluminum oxide as described in American Ceramics Society Bulletin, June 1956 at page 217. The thickness of the binder will depend on the use for the laminate. Ordinarily, the thickness of the coating will be from about .001 inch to .015 inch.

The inorganic binders may contain any of the customary nonreactive inorganic fillers in finely divided form, e.g., quartz, mica, aluminum oxide, silica, furnace slag, Portland cement, silica carbides, flint, clay, magnesium silicofluoride, magnesium oxide, zinc oxide, aluminum hydrate, barium fluosilicate, potassium fluosilicate, sodium fluosilicate, strontium fluosilicate, silica, etc.

After the treated fabrics have been coated with the inorganic binders, the laminate assembly may be prepared by plying together a multiplicity of sheets of the coated fabrics. Any number of plies may be used to form the laminate and will, of course, depend upon the desired thickness and the end use for the laminate. Although any number of plies may be used, for most purposes, it is preferred to use from 10 to 30 plies of treated fabric which will provide layers of the laminate. For most purposes, the laminate may range in thickness from .125 inch to .500 inch.

The assemblied plies may be hand-molded and air cured, but preferably are lightly pressed together in a mold 15, FIG. 3, and cured at elevated temperatures. The laminate may be cured at a temperature ranging from 50° F. to 1100° F. for a period of 2 to 78 hours. Obviously, the length of cure is proportionally related to the temperature. A particularly useful cure when the fabric is comprised of glass fibers, coated with a silicone resin, and bound together by means of sodium silicate, has been found to be a cure of 200° F. for about 3 hours followed by a post cure of 500° F. for 10 hours. It is desirable to start the cure at a lower temperature and thereafter elevate the temperature because the lower temperature will drive off trapped moisture without creating voids and the higher temperature will provide a laminate which displays better electrical properties and flex properties.

More specifically, the invention is concerned with a method of preparing an inorganic laminate 14 which is characterized by excellent stability and dielectric properties at temperatures to 2500° F. and above comprising coating a fiber glass fabric with a silicone resin dissolved in a solvent, heating said coated fabric to remove the solvent, coating the treated fiber glass fabric with a layer about 0.015 inch thick comprised of about 50% by weight of sodium silicate and about 50% by weight of finely ground quartz, assembling the laminate by plying together from 10 to 30 sheets of the previously prepared fabric, pressing the laminate assembly under a pressure of about 5 to 10 pounds per square inch, and thereafter curing the laminate.

The invention can further be illustrated by means of the following example which is not intended to be a limitation on the scope of the invention.

EXAMPLE 1

Sheets of fiber glass cloth about .010 inch thick were coated with a silicone resin marketed by Dow-Corning Corp. as D-C 2106 which is a laminating resin characterized by low thermal conductivity, is transparent to radar waves in the range of 10,000 megacycles per second and which is marketed as a 60% solids toluene solution having a viscosity at 25° C. of 25 centipoises and a specific gravity at 25° C. of 1.08 and which has a gel time at 480° F. of 5–10 minutes. After the fiber glass fibers were coated with a thin coating of the resin, the solvent was removed by flash drying the sheets at 100° F. for 2 hours. Thereafter, the treated fiber glass sheets were coated with a matrix composition comprised of 65% by weight of sodium silicate and 35% by weight of finely ground quartz. The thickness of the coating layer was about .015 inch. Fifteen sheets of the treated and coated fiber glass were plied together in adjacent relation and placed between the spaced apart platens of a standard molding press. Shims .350 inch thick were placed adjacent to the ends of the laminate and the press closed against the shims to provide a laminate which was about .350 inch thick. This required a contact pressure of about 5–10 pounds per square inch. The laminate was then cured at a temperature of 200° F. for 3½ hours followed by further heating at a temperature of 500° F. for 78 hours.

This laminate was subjected to tests. A flex test, in accordance with Federal Specification LP–406b, Method 1031.1, was performed.

*Table I*

PHYSICAL PROPERTIES OF INORGANIC LAMINATE PREPARED ACCORDING TO EXAMPLE 1

| Flexural Ultimate Stress: | Pounds |
|---|---|
| Room temperature | 11,000 |
| 450° F | 10,800 |
| 750° F | 10,500 |

Electrical properties were tested on the Massachusetts Institute of Technology wave guide testor using the MIT wave guide electrical procedure at 8600 megacycles.

*Table II*

ELECTRICAL PROPERTIES OF INORGANIC LAMINATE PREPARED ACCORDING TO EXAMPLE 1
[At 8,600 mc.]

| | Room Temperature | 500° F. | 1,000° F. |
|---|---|---|---|
| Dielectric Constant (K) (wave guide) | 3.3 | 3.47 | 3.46 |
| Loss Tangent (wave guide) | .0089 | .0167 | .0199 |

As shown above, these laminates display excellent dielectric properties and withstand great stresses.

When it is desired to use the laminates of this invention as insulating panels, it may be desirable to place thin sheets of asbestos fibers between the various inorganic fabric layers.

The laminates of this invention, e.g. articles which act as thermal insulation barriers, etc., are useful in the fabrication of various industrial articles.

While certain representative embodiments and details have been shown for the purpose of illustrating the invention, it will be apparent to those skilled in this art that various changes and modifications may be made therein without departing from the spirit or scope of the invention.

I claim:
1. The method of preparing an inorganic laminate which is characterized by excellent stability and di-electric properties at temperatures to 2500° F. and higher comprising
    (1) Coating a fiber glass fabric with a silicone resin dissolved in a solvent,
    (2) Heating said coated fabric to a temperature of about 100° F. for a period of about 2 hours in order to remove the solvent,
    (3) Coating the treated fiber glass fabric with a layer about .015 inch thick comprised of about 50% by weight of sodium silicate and about 50% by weight of finely ground quartz,
    (4) Assembling the laminate by plying together from 10 to 30 sheets of the previously prepared fabric,
    (5) Pressing the laminate assembly under a pressure of about 5 to 10 pounds per square inch,
    (6) Curing the laminate at a temperature of about 200° F. for about three and one-half hours,
    (7) Continuing the cure at a temperature of about 500° F. for about 10 hours in order to provide the laminate,
2. The method of preparing an inorganic laminate characterized by excellent stability and dielectric properties at temperatures to 2500° F. and higher comprising
    (1) Coating a fabric woven of filaments comprised of a multiplicity of glass fibers with a protective silicone resin,
    (2) Coating the treated fabric with a composition comprised of about 50% by weight of an inorganic binder selected from the group consisting of sodium silicate, potassium silicate, magnesium oxysulfate, magnesium oxychloride, calcium aluminate, silica gel and a phosphate cement and about 50% by weight of an inorganic filler selected from the group consisting of ground quartz, mica, aluminum oxide, silica, ground furnace slag, magnesium silicofluoride, magnesium oxide, zinc oxide, aluminum hydrate, barium fluosilicate, potassium fluosilicate, sodium fluosilicate, strontium fluosilicate and silica,
    (3) Assembling the laminate by plying together a multiplicity of sheets of the treated fabric,
    (4) Pressing the laminate under a pressure of about 5 to 10 pounds per square inch,
    (5) Curing the laminate at a temperature of about 50° F. to 200° F. for a period of about 1 to 5 hours,
    (6) Continuing the cure at a temperature between 200° F. and 500° F. for a period of about 2 to 10 hours in order to provide the laminate.
3. The method of preparing an inorganic laminate characterized by excellent stability and dielectric properties at temperatures to 2500° F. and higher comprising
    (1) Coating a layer comprised of glass fibers with a protective coating of a silicone resin,
    (2) Coating the treated layer with an inorganic binder containing an inorganic filler,
    (3) Assembling the laminate by plying together a multiplicity of plies,
    (4) Molding the laminate by lightly pressing the laminate assembly, and
    (5) Curing the laminate at a temperature of 200° F. to 1100° F. for a period of 2 to 78 hours.
4. An inorganic laminate characterized by excellent stability and dielectric properties at temperatures to 2500° F. and higher comprised of about 10 to 30 layers of glass fibers which have been treated with a silicone resin, the sheets of treated glass fibers being held together in spaced apart relationship by means of a binder comprised of about 50% by weight of sodium silicate and 50% by weight of ground quartz filler.
5. An inorganic laminate characterized by excellent stability and dielectric properties at temperatures to 2500° F. and higher comprised of a multiplicity of sheets of inorganic glass fibers, said fibers being coated with a protective silicone resin, the sheets of treated glass fiber being held together in spaced apart relationship by means of an inorganic binder comprised of an inorganic binder selected from the group consisting of sodium silicate, potassium silicate, magnesium oxysulfate, magnesium oxychloride, calcium aluminate, silica gel, and a phosphate cement and an inorganic filler selected from the group consisting of ground quartz, mica, aluminum oxide, silica, furnace slag, magnesium silicofluoride, magnesium oxide, zinc oxide, aluminum hydrate, barium fluosilicate, potassium fluosilicate, sodium fluosilicate, strontium fluosilicate, and silica.

References Cited in the file of this patent

UNITED STATES PATENTS

| | | |
|---|---|---|
| 2,405,528 | Skolnik | Aug. 6, 1946 |
| 2,434,466 | Marc | Jan. 13, 1948 |
| 2,444,347 | Greger | June 29, 1948 |
| 2,563,288 | Steinman | Aug. 7, 1951 |
| 2,593,818 | Waggoner | Apr. 22, 1952 |
| 2,610,957 | Steinman et al. | Sept. 16, 1952 |
| 2,717,841 | Biefeld | Sept. 13, 1955 |
| 2,749,253 | Shoemaker | June 5, 1956 |